(No Model.) 2 Sheets—Sheet 1.
H. J. DOUGHTY.
MECHANISM FOR THE MANUFACTURE OF RUBBER SHOES.
No. 404,265. Patented May 28, 1889.
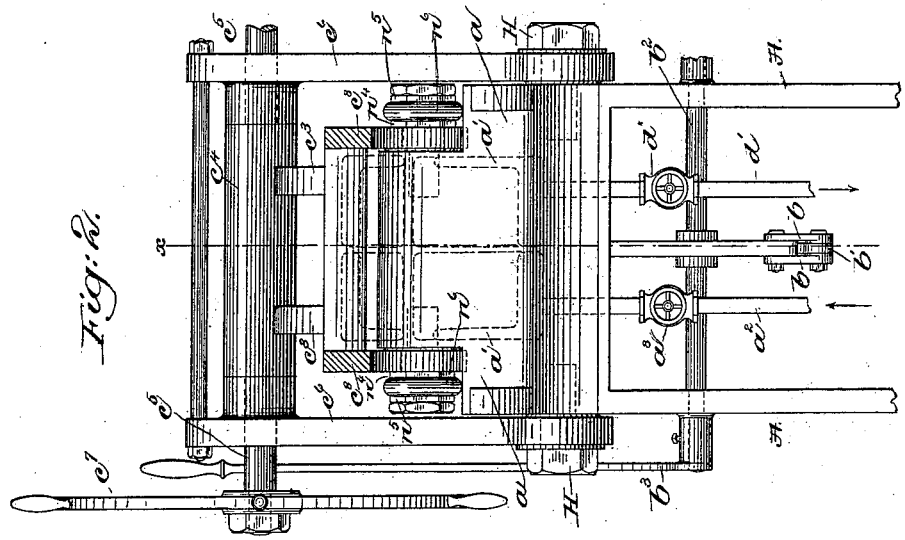
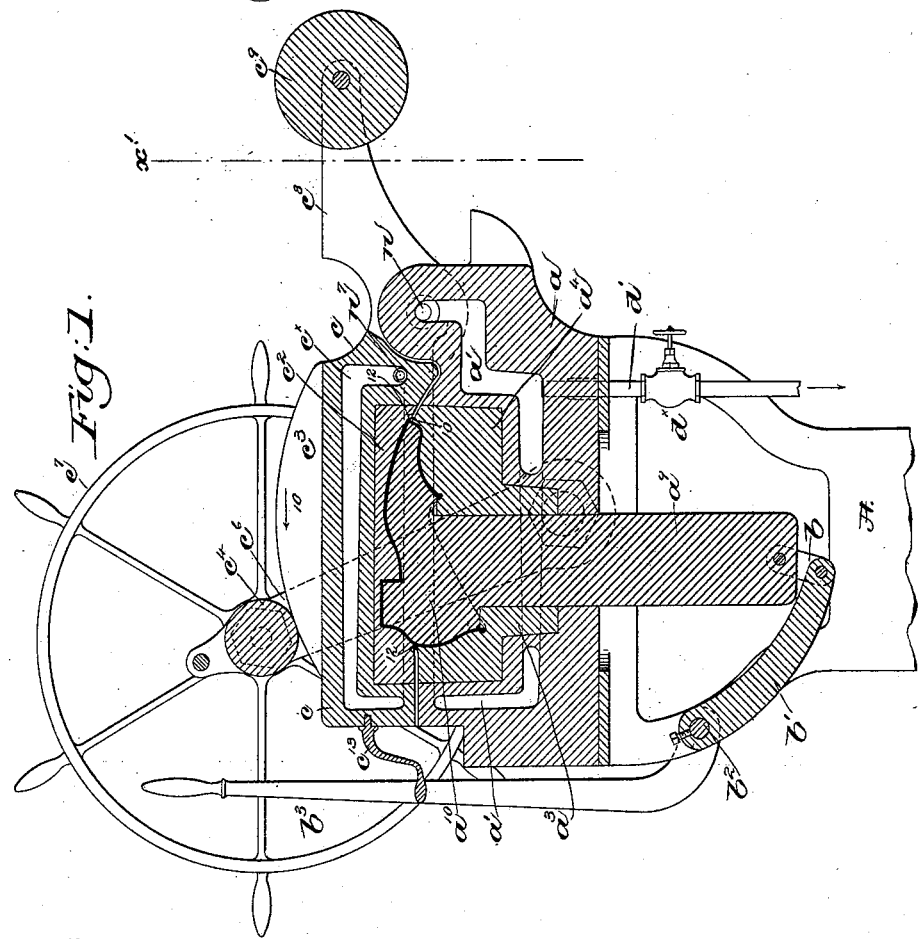
Witnesses.
Fred L. Emery.
John F. C. Prentkert
Inventor.
Henry J. Doughty.
By Crosby & Gregory attys (No Model.) 2 Sheets—Sheet 2.
H. J. DOUGHTY.
MECHANISM FOR THE MANUFACTURE OF RUBBER SHOES.
No. 404,265. Patented May 28, 1889.
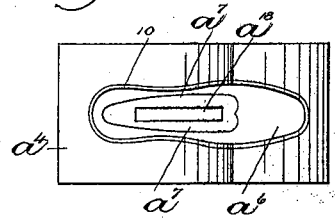
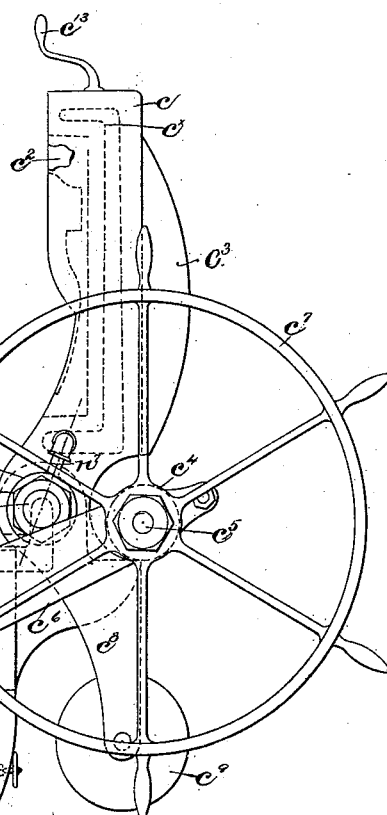
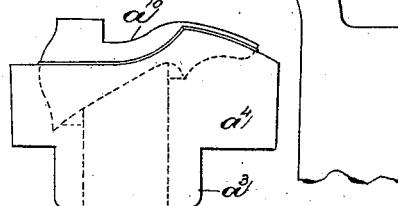
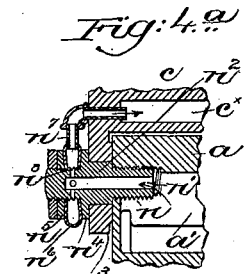
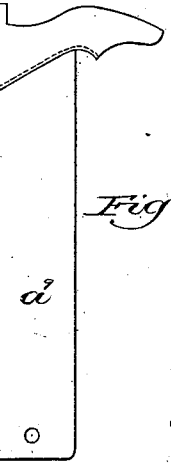
Witnesses.
Fred L. Emery.
John F. C. Preindert.
Inventor.
Henry J. Doughty
by Crosby & Gregory
Attys.

UNITED STATES PATENT OFFICE.

HENRY J. DOUGHTY, OF MALDEN, MASSACHUSETTS, ASSIGNOR TO JOSEPH BANIGAN, OF PROVIDENCE, RHODE ISLAND.

MECHANISM FOR THE MANUFACTURE OF RUBBER SHOES.

SPECIFICATION forming part of Letters Patent No. 404,265, dated May 28, 1889.

Application filed September 5, 1887. Serial No. 248,822. (No model.)

*To all whom it may concern:*

Be it known that I, HENRY J. DOUGHTY, of Malden, county of Middlesex, and State of Massachusetts, have invented an Improvement in Mechanism for the Manufacture of Rubber Shoes, of which the following description, in connection with the accompanying drawings, is a specification, like letters on the drawings representing like parts.

This invention has for its object to provide an apparatus by which boots and shoes may be made in a novel manner from rubber or other like plastic material, my invention as herein embodied being especially applicable for the production of shoes.

In accordance with my invention I employ a compound metallic mold constructed, preferably, in two parts, one part, which I shall call the "stationary mold," being fixed, while the other part, constituting the top of the mold, is made movable, the said stationary and movable molds each co-operating with or having fixed with relation to them a steam chest or jacket, whereby the molds may be heated to the desired degree to effect the vulcanization of the rubber, the movable mold and its co-operating steam chest or jacket being so connected with the stationary mold and its co-operating steam chest or jacket as to insure the retention of the heat entirely throughout the compound mold in both its closed and open positions. So, also, in accordance with my invention the top of the stationary mold and its surrounding steam-chest and the lower side or face of the movable mold and its surrounding steam-chest are so shaped that what is to constitute a part of the shank and a part of the counter of the shoe about the heel is formed within the movable mold, and the line of junction of the material laid within the stationary mold and of the material laid upon the last when the latter has been pulled down into the stationary mold will be practically in the line of the widest part of the shoe from the heel toward its toe measured in the direction of the width of the last, as will be described.

The steam-chest which receives the stationary mold will in practice be supported on an upright or standard.

The connection between the steam-chests inclosing the stationary and movable molds is made, as herein shown, by or through a hollow hinge or joint and connecting steam-ports.

The stationary mold—it in practice receiving the rubber to form the top part of the shoe—has a slot or mortise, through which is passed the spindle of the last or inside former, which gives shape to the inside of the boot or shoe, the other end of the said spindle below the stationary mold being operatively joined with last-actuating mechanism, whereby the last may be pulled down into or lifted from the stationary mold.

To shape the mouth of the shoe, and at the same time provide the edge of the mouth with a thickened or beaded edge, I have provided the stationary mold about the slot therein, through which the spindle of the last passes, with a groove or channel, into which the last in its descent forces a portion of the rubber laid into the stationary mold, and I have provided the last with a lip, which, after the said channel has been filled with rubber, meets in its descent a shoulder of the stationary mold, the pressure between the lip and shoulder being such as to sever the material smoothly to constitute the mouth of the shoe, and at the same time remove any surplus material, thus giving final shape to the mouth of the shoe.

The rubber or other plastic material to be used for the upper part of the shoe is cut by dies or in other suitable manner from, preferably, a sheet of rubber to constitute a blank, the said blank being laid into the stationary mold, and thereafter the last or inside former is drawn down into the stationary mold upon the said material, and then a second sheet or layer of rubber or other material to form the bottom or sole and a portion of the top is placed upon the top of the last or inside former, and the movable mold is brought down upon and so as to cover the said last when pressure is applied to the movable mold, and the two parts of the mold are held firmly together within the steam-chests until the rubber or other material is properly vulcanized together.

My invention in machines for manufacturing rubber shoes consists in certain features which will be hereinafter pointed out in the specification and made the subject of claim at the end thereof.

Figure 1 is a partial section of an apparatus embodying my invention, the section being in the line $x$, Fig. 2, the mold being closed and the material in it being in heavy black line. Fig. 2 is a partial sectional elevation of the apparatus represented in Fig. 1, viewing the same from the right of the dotted line $x'$. Fig. 3 is a partial right-hand side elevation of the machine shown in Fig. 1, with the movable mold elevated, the vulcanized shoe or foot-covering being yet on the last. Fig. 4 is a top or plan view of the stationary mold removed. Fig. $4^a$ is a sectional detail showing the construction of the joint between the steam-chests surrounding the stationary and movable molds; Fig. 5, a side elevation of the stationary mold detached and with the former or last therein in its lowest position; Fig. 6, a detail of the movable mold; Fig. 7, a detail of the last or inside former and its connected spindle; and Fig. 8 is a cross-section of the stationary mold and the last or inside former therein in the line $x^2$, Fig. 5, chiefly to show the groove by which to form the bead about the mouth of the shoe.

The upright or standard A, of any suitable shape, supports a casting, cored, as at $a'$, to form a steam chest or jacket, as $a$, into which steam or heated air or other heated medium may be admitted through a suitable pipe, as $a^2$, connected with any usual steam supply, the said pipe having a cock or valve, as $a^8$. (See Figs. 2 and 3.)

The steam-chest $a$, as herein shown, has a central opening to receive the neck $a^3$ of and support firmly in position (see Fig. 1) a stationary mold, $a^4$, the latter being countersunk or cut away, as at $a^6$, (see Fig. 4,) to conform to the shape required for the upper part of the shoe or foot-covering, the said countersink terminating in a shoulder, as $a^7$, the said mold at the junction of its sides with the shoulder being provided with a groove, as $p$, (see Fig. 8,) for the reception of a sufficient quantity of rubber or other material to constitute a bead, $p'$, about the mouth of the shoe S to be made. (See Fig. 3.)

The stationary mold $a^4$ is provided with a slot, as $a^{18}$, through which is extended the spindle $a^9$ of a last or inside former, $a^{10}$, so that through the said spindle the said last connected to and preferably integral with the spindle may be raised from or be lowered into the stationary mold $a^4$ without removing the last from the machine, as heretofore done.

The last $a^{10}$, at or near its junction with the spindle and about the spindle, is cut away, as shown best in Fig. 8, to leave a lip, $p^5$, to hit the shoulder $a^7$ and sever or separate the material by pressure, as will be described. The spindle $a^9$ below the stationary mold is operatively connected with last-actuating mechanism, herein shown as composed of a link, $b$, an arm or lever, $b'$, and a rock-shaft, as $b^2$, to which the said arm is connected, the said rock-shaft having an attached lever, $b^3$, by which it may be turned to raise or lower the spindle and last, as may be desired.

I do not desire to limit my invention to the particular devices herein shown for actuating the last, as instead I may employ any other well-known or equivalent mechanism.

The steam-chest or casting $a$, as herein shown, has hinged to it a steam-chest, $c$, provided with suitable steam-passages, $c^*$, to permit the circulation of steam through the said steam-chest to heat the movable mold $c^2$, secured within it. The hinge employed for connecting the steam-chests $a$ and $c$ is best shown in Fig. $4^a$.

Referring to Fig. $4^a$, the steam-chest $a$ has screwed into it at opposite sides a hollow trunnion, $n$, having a steam-port, $n'$, and provided with a smooth portion, $n^2$, which receives upon it the perforated ear $n^3$ of the steam-chest $c$, so that the steam-chest $c$ turns freely about the said trunnion.

Each trunnion outside the portion supporting the ear is provided with a flange, as $n^4$, between which and a washer, $n^5$, is placed a steam-receiving ring, $n^6$, which by a pipe, as $n^7$, having an elbow, is connected with the steam-passage $c^*$ in the movable steam-chest $c^2$. Each hollow trunnion $n$ is bored through from its outer side, forming suitable ports, as $n^8$, to permit the steam to pass from the ports $a'$ in the chamber $a$ through the opening $n^8$ into the hollow steam-ring and into the steam-passage $c^*$.

Having shown one form of steam-hinge, I desire it to be understood that I do not intend to limit my invention to the shape of hollow hinge herein represented, as I may employ any other well-known or equivalent connection.

The steam-chest $c$ receives and has secured in it firmly in suitable manner the movable mold $c^2$, which is shaped or countersunk as best shown in Figs. 1 and 6, the shape of the countersink being such as to give proper shape to the sole or bottom of the shoe, the said movable mold, as herein shown, being shaped to form a heel integral with the sole.

The steam-chest $c$, as herein shown, is provided with two cam ridges or surfaces, as $c^3$, over which is moved a roller, $c^4$, having long journals $c^5$, which are extended through arms or links $c^6$, pivoted loosely upon pivot-studs H, fixed to the steam-chest $a$ or other fixed part of the frame, the said roller $c^4$ and link $c^6$ forming a pressing-frame. The journals of the roll $c^4$ outside the frame at each end have fixed to them suitable hand-wheels, as $c^7$, by which the said roll $c^4$ may be turned positively and be made to travel over the cam ridges or surfaces $c^3$ in the direction of the arrow 10, Fig. 1, when the movable mold and chest surrounding it are to be forced down upon the stationary mold and its surrounding chest to form and to vulcanize into shape the material held in the mold and inclosing the last or inside former. The steam-chest $c$ has two arms, $c^8$, provided with a counterbalancing-weight, $c^9$, to aid the operator in handling the movable mold and its surrounding steam-chest.

In operation the rubber or other plastic material in sheet form and of the desired thickness will be cut to form a blank of the size and shape suitable to fill the space in the stationary mold and constitute the chief part of the top of the shoe to be made, the said blank being fitted about the spindle of the last when in its elevated position, as in Fig. 3. The material having been laid into the stationary mold, the operator turns the rock-shaft $b^2$ and draws the last or inside former down upon the material laid in the stationary mold, and then the operator lays another quantity of rubber or other material, which is to constitute the sole of the shoe and a small portion of the shoe immediately adjacent to the heel and shank thereof, and then, by means of the handle $c^{13}$, or otherwise, the operator turns the movable mold $c^2$ and its surrounding steam-chest $c$ down upon the stationary mold and its surrounding steam-chest, and thereafter the operator causes the roller $c^4$ to be moved over the cam-surfaces $c^3$, as in Fig. 1, thereby forcing the movable mold down closely upon the rubber previously laid upon the sole-forming part of the last or former, and the said parts are held closely together for a sufficient length of time to properly vulcanize the material within the mold and surrounding the last. In the descent of the last, as described, into the stationary mold the sides of the last cause the material laid in the stationary mold to enter the groove $p$ and form a bead or thickened portion, $p'$, and the lip $p^3$ of the last, hitting the shoulder of the stationary mold by pressure, causes the material to be severed cleanly, leaving a smooth mouth finished by the bead. When the material has been properly vulcanized to complete the shoe, the steam-chest $c$ and movable mold are lifted, uncovering the last or inside former, which is then raised from the stationary mold into the position Fig. 3, when the operator removes the shoe S from the last, leaving the latter, however, suspended above the stationary mold ready to be again depressed when the stationary mold has received a new stock of material. The steam or other heating medium, after its circulation through the steam channels or spaces in the steam-chests $a$ and $c$, is exhausted through a pipe, as $d'$, controlled by a suitable cock, as $d^*$.

It is obvious that the direction of the steam channels or spaces in the steam-jackets may be variously changed without departing from my invention, and so also, instead of the particular devices shown by which to positively force the movable mold down upon the material surrounding the last in the stationary mold, I may employ any other well-known equivalent mechanism.

Referring to Fig. 5 it will be seen that the top of the stationary mold $a^4$ and its surrounding steam-chest and the lower side or face of the movable mold and its surrounding steam-chest are so shaped that what is to constitute part of the shank and part of the counter of the shoe above the heel is formed within the movable mold, the line of junction of the material laid within the stationary mold and of the material laid upon the last or inside former when pulled down into the stationary mold, as described, being shown by the dotted line 8, Fig. 3, so that the line of union or junction of the material employed in the shoe is practically in the line of the widest part of the shoe from toe to heel or throughout the entire length of the shoe.

The stationary and movable molds may be readily removed from the steam-chests surrounding them, and molds of other size and shape be substituted.

Dividing the mold as shown and described, so as to join the material constituting the top and bottom parts of the shoe together at the widest part of the shoe throughout from toe to heel, enables the shoe to be made seamless and the vulcanized shoe to be readily withdrawn from the mold.

The top of the stationary mold next the last or inside former is provided with a lip, as 10, and the under side of the movable mold $c^2$ has a corresponding lip, 12, which meet as the movable mold is forced down into position to vulcanize the material surrounding the last or inside former, the said lips removing the surplus material forming part of the two layers applied to the stationary mold and the last, as stated, being a line of junction at 8.

The shoe herein described forms the subject-matter of an application, Serial No. 248,821, filed September 5, 1887.

I claim—

1. In an apparatus for forming boots and shoes from rubber or equivalent plastic material, the mold $a^4$ and surrounding steam-chest and the mold $c^2$ and its surrounding steam-chest, combined with the last and its spindle extended through and adapted to reciprocate in one of the molds, one of the said molds being made movable with relation to the other, to operate substantially as described.

2. The mold $a^4$, its surrounding steam-chest, the mold $c^2$, shaped to aid in the formation of the sole and heel and also a part of the upper of the shoe about the heel, and the steam-chest surrounding the said mold $c^2$ and the metallic last, combined with steam-connecting devices, substantially as described, between the said steam-chest $a^4$ and $c^2$, whereby steam may be admitted into both when the said molds are opened and closed, to operate substantially as described.

3. In a machine for the manufacture of shoes from india-rubber compound, a metallic last, its co-operating two-part molds $a^4$ $c^2$, divided longitudinally at a point between the line of the bottom of the last and the top of the last for a portion of the length of the said molds where the last is of greatest thickness in longitudinal cross-section, and the steam-chests surrounding the said molds, to operate substantially as and for the purposes set forth.

4. The mold $a^4$, provided with a shoulder, combined with the last or inside former provided with a lip to co-operate with the said shoulder to form the mouth of the shoe, substantially as described.

5. The mold $a^4$, having a shoulder and groove at or near the said shoulder, combined with the last or inside former having a lip, whereby the mouth of the shoe is provided with a bead and is trimmed smoothly, substantially as described.

6. In an apparatus for the manufacture of boots and shoes from rubber or other plastic material, a mold, $a^4$, to receive the material to form the chief part of the top of the shoe, and a metallic last having a shank, as described, to enter and slide vertically within the said mold, combined with a mold, $c^2$, to force the rubber or equivalent material upon the sole-forming portion of the last held within the mold $a^4$, the junction of the two molds being substantially in line of the widest part of the shoe throughout from toe to heel, substantially as described.

7. In an apparatus for forming boots and shoes from rubber or equivalent plastic material, a mold, $a^4$, its surrounding steam-chest, and a mold, $c^2$, and a steam-chest having cam-surfaces and surrounding the said mold, combined with a pressing-frame to travel over the said cam-surfaces and force the two molds in contact, substantially as described.

8. The mold $a^4$, its surrounding steam-chest, the pivoted mold $c^2$, and its surrounding steam-chest, combined with a counterbalancing-weight for the said mold $c^2$ and steam-chest $c$, substantially as described.

In testimony whereof I have signed my name to this specification in the presence of two subscribing witnesses.

HENRY J. DOUGHTY.

Witnesses:
G. W. GREGORY,
C. M. CONE.